June 3, 1958  E. B. BYAM  2,836,992
DRIVE AND EMERGENCY BRAKE MECHANISM FOR NUT
FORMERS, HEADERS AND THE LIKE
Filed May 24, 1954  4 Sheets-Sheet 1
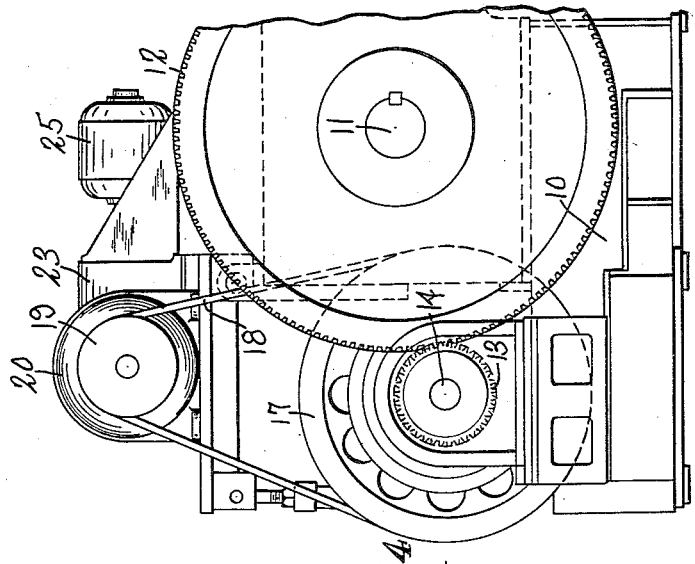
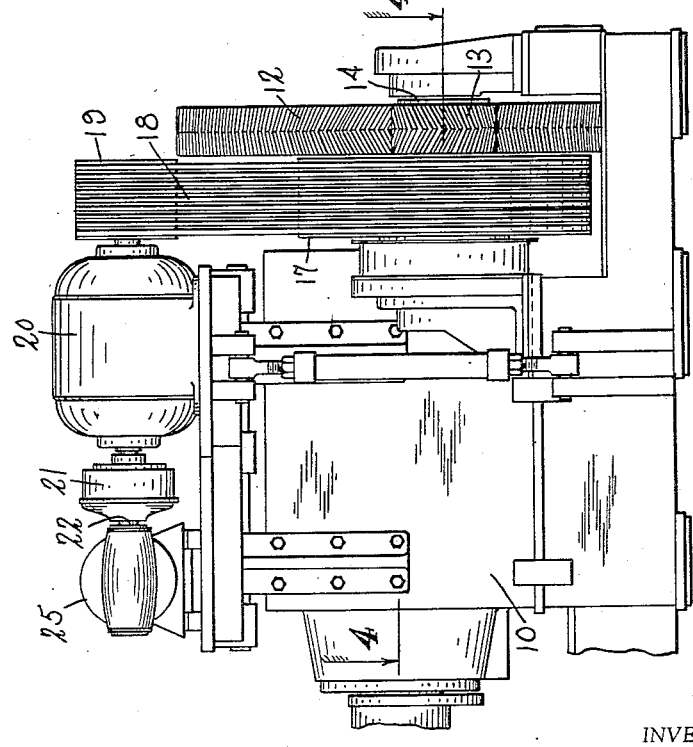
INVENTOR
Erwin B. Byam
BY Rockwell & Berthoton
ATTORNEY

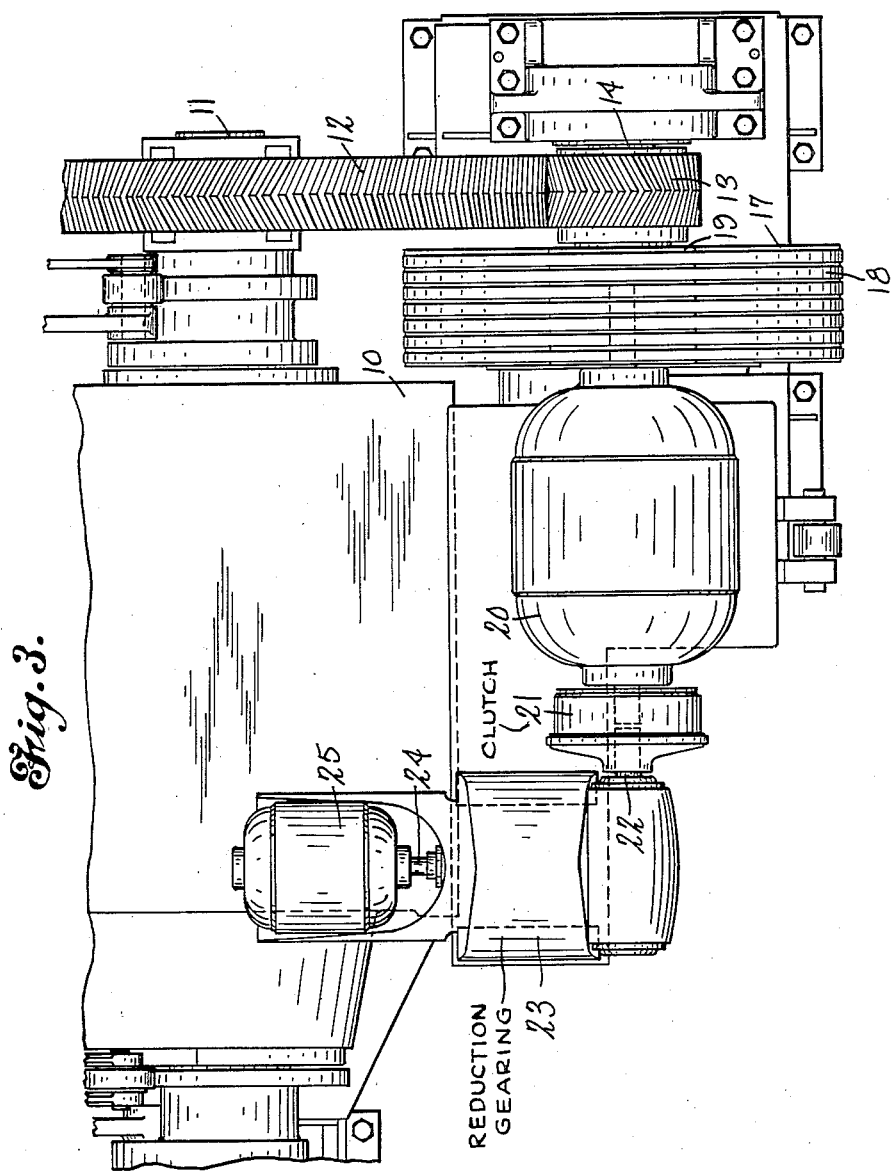

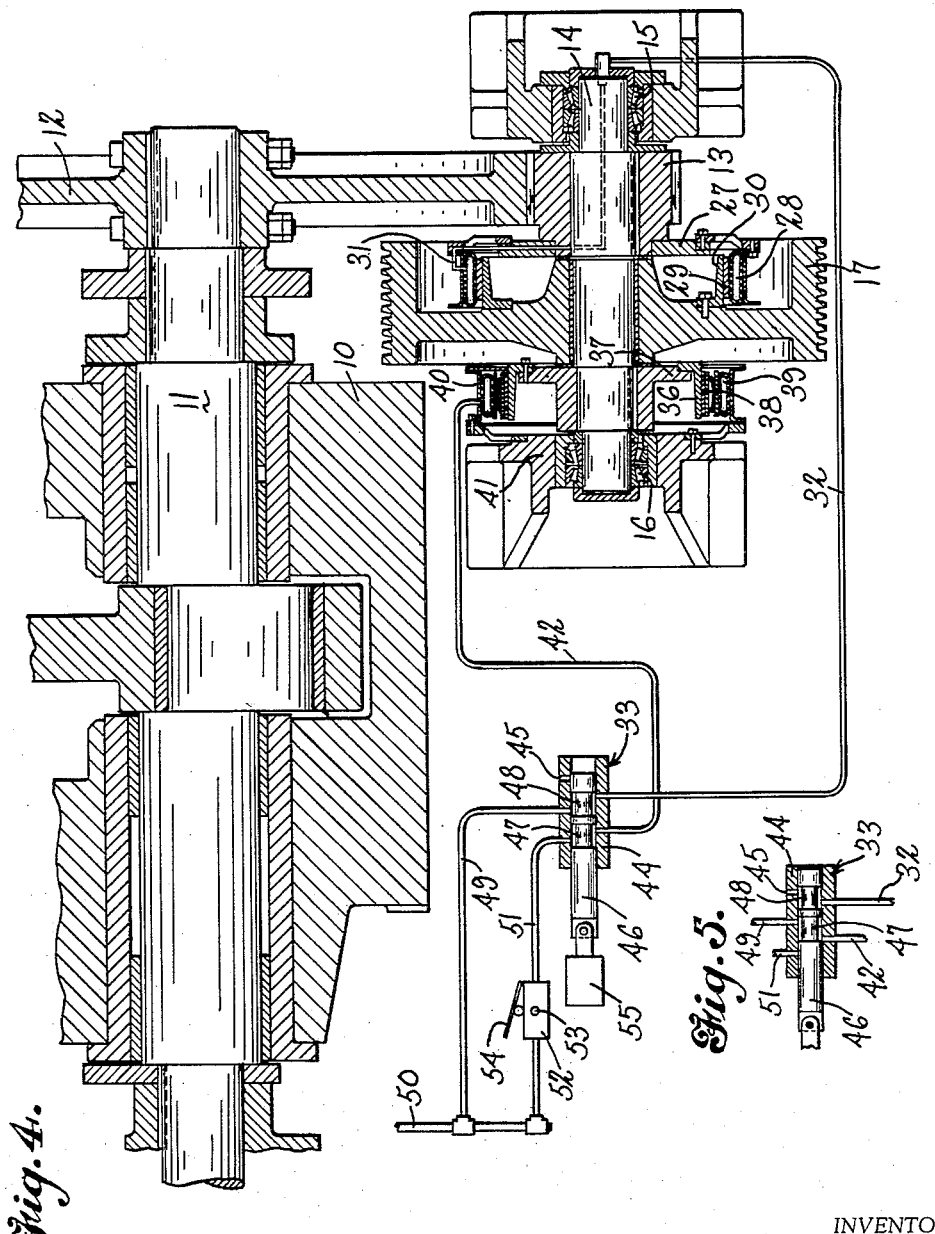

June 3, 1958 E. B. BYAM 2,836,992
DRIVE AND EMERGENCY BRAKE MECHANISM FOR NUT
FORMERS, HEADERS AND THE LIKE
Filed May 24, 1954 4 Sheets-Sheet 4

INVENTOR
Erwin B. Byam
BY
Rockwell Bartholow
ATTORNEY

United States Patent Office 2,836,992
Patented June 3, 1958

2,836,992

DRIVE AND EMERGENCY BRAKE MECHANISM FOR NUT FORMERS, HEADERS AND THE LIKE

Erwin B. Byam, Wolcott, Conn., assignor to The Waterbury Farrel Foundry & Machine Company, Waterbury, Conn., a corporation of Connecticut Application May 24, 1954, Serial No. 431,653

6 Claims. (Cl. 74—665)

This invention relates to a drive mechanism for machines such as a header or nut former which commonly employ a reciprocating gate carrying tools which cooperate with dies mounted upon a die bed carried by the frame of the machine.

In machines of this character it is necessary to "set up" the tools at the beginning of an operation, and it is, therefore, desirable to have an arrangement to operate the machine at a very slow speed. Also since these devices are relatively massive, the moving parts possess a considerable inertia and it is quite desirable to have provision for driving them at a slow speed initially in order to overcome the high static inertia and also be able to drive them at a relatively high speed during regular operation after the inertia has been overcome.

In the present application there is illustrated an auxiliary or "jogging" drive which is connected by a suitable clutch such as an air clutch to the rotor of the main driving motor by which the machine is regularly operated. A motor of relatively small size is employed for the auxiliary drive, a gear reduction unit being employed between this auxiliary driving motor and the shaft of the main motor so that by means of this reduced driving ratio the machine will be driven at a relatively slow speed but the applied torque will be sufficient to overcome the initial static inertia.

It is also desirable in such machines to provide a device which will bring the moving parts to a quick stop in case of an emergency. Should any part of the machine break or should a blank for any reason be caught in the machine, it is desirable to immediately discontinue the application of power to drive the machine and also to apply braking means to the operating parts to bring them to a quick stop.

For this purpose there is provided a clutch-and-brake arrangement such that upon the pressing of a safety button or the like a clutch will be immediately disengaged from, and a brake applied to, a jack shaft or auxiliary shaft driven from the main motor and in turn drivingly connected with the crank shaft of the machine. The main motor is connected to this jack shaft by means of a pulley wheel which is loose upon the shaft but connected therewith by the air-operated clutch. For this reason when the emergency button is pressed and the clutch released, this wheel is free to rotate idly upon the shaft so that one of the major inertia members is eliminated from the parts of the machine which are stopped.

As the jack shaft is arranged to rotate at a considerably higher speed than the crank shaft of the machine, the clutch and brake mechanism may be of smaller size and more economical in cost because of the mechanical advantage of this faster running shaft.

One object of the invention is to provide a new and improved drive mechanism for the main shaft of a header, nut former, or like machine.

A further object of the invention is to provide a novel form of auxiliary drive for use in 'setting up" the machine for operation and for initiating the operation of the machine until it comes up to speed when the main drive for the device is employed.

A still further object of the invention is to provide an auxiliary drive of this character which is connected to the rotor or shaft of the main driving motor which serves to actuate the machine when it is in operation.

Still another object of the invention is to provide improved means for stopping the machine quickly in case of an emergency and reducing the inertia which must be overcome to bring the parts of the machine to a stop.

A still further object of the invention is to provide a drive mechanism for a machine of this character wherein a relatively high speed jack shaft is employed, which jack shaft serves to drive the main crank shaft of the machine, the jack shaft being driven from the main motor and providing upon the jack shaft a clutch and brake mechanism which will serve to bring the operating parts of the device to an instantaneous stop when desired.

To these and other ends the invention consists in the novel features and combinations of parts to be hereinafter described and claimed.

In the accompanying drawings:

Fig. 1 is a front elevational view of a conventional form of header or nut former embodying my invention;

Fig. 2 is an end elevation thereof;

Fig. 3 is a top plan view;

Fig. 4 is a horizontal sectional view on line 4—4 of Fig. 1;

Fig. 5 is a detail sectional view of the valve which controls the safety mechanism, the parts being shown in a position different from that shown in Fig. 4.

Figure 6:
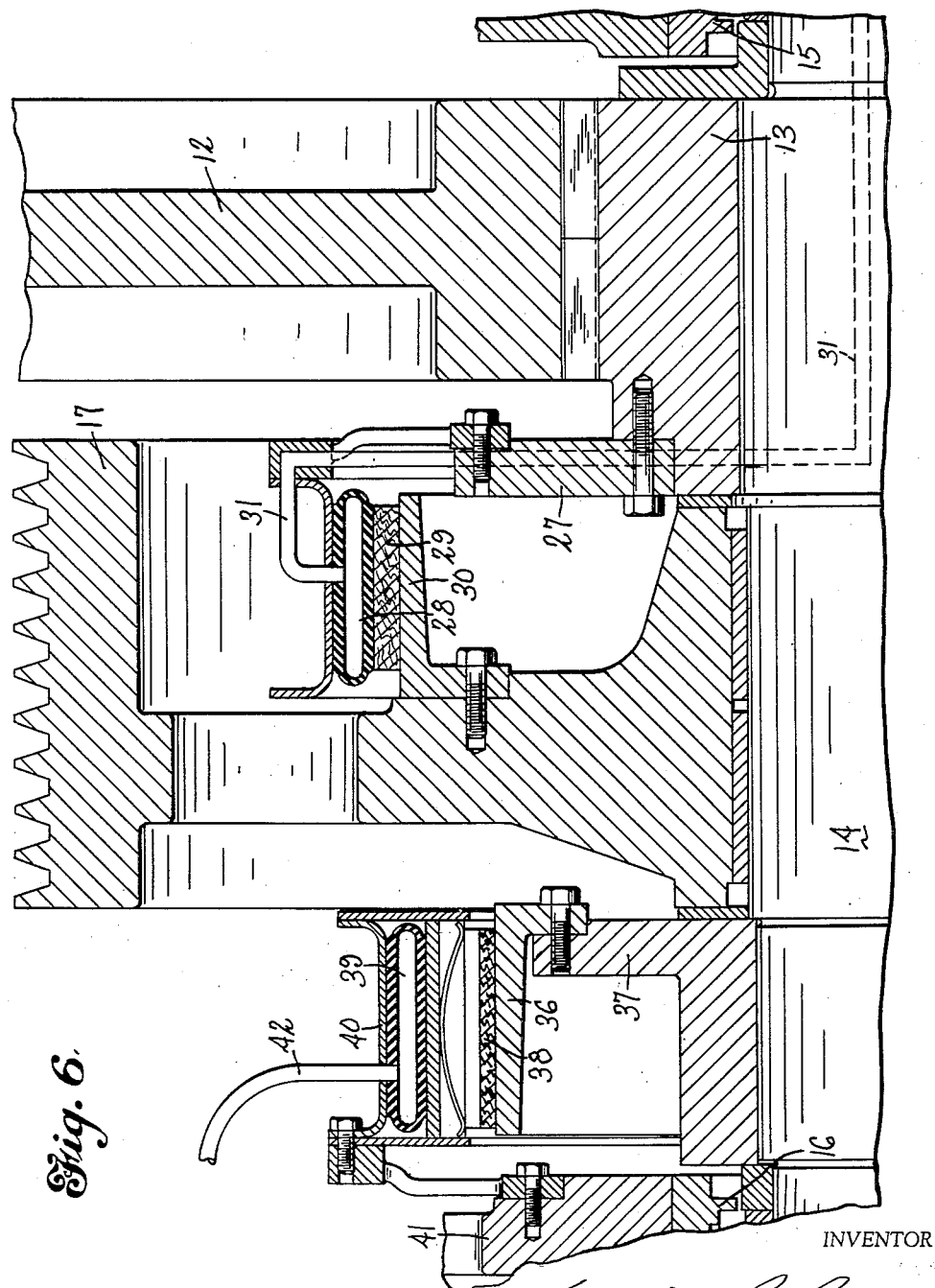
Fig. 6 is an enlarged sectional view through the jack shaft or auxiliary shaft showing the clutch and brake mechanism.

To illustrate a preferred embodiment of my invention, I have shown in Fig. 1 of the drawings a nut former comprising a frame 10 within which is rotatably mounted the usual crank shaft 11 which serves to drive the gate of the machine. Upon this crank shaft is secured a relatively large gear 12, this gear being driven by a smaller gear 13 rigidly secured to a jack shaft 14, this shaft being mounted in bearings 15 and 16 in the frame.

Upon the shaft 14 a pulley wheel 17 is freely mounted, this wheel being adapted to be clutched to the shaft by mechanism which will be hereinafter described. This pulley 17 is driven by belts 18 from a pulley 19 secured to the projecting end of the rotor shaft of the main driving motor 20 mounted upon the frame 10.

The shaft of the motor is extended from the casing to the end opposite that upon which the pulley 19 is mounted, and upon the extended end of this shaft is an air clutch 21 by which the motor shaft may be secured to the shaft 22 of a gear reduction unit 23, this unit being driven in turn by the shaft 24 of an auxiliary motor 25.

With the above construction it will be seen that the auxiliary motor together with gear reducting unit 23 and the clutch 21 will, when the motor 25 is operated, drive the rotor shaft of the main motor 20 and thus serve as an auxiliary drive to drive the pinion 13 and gear 12 when the main motor is not energized. It will be appreciated that through the gear reduction unit 23 the crank shaft of the nut former will be driven at a relatively slow speed so that it may be "jogged" or operated intermittently through relatively small movements in order to set up the tools of the machine. Also it may be started slowly when it is ready for operation in order that the initial inertia be overcome at a relatively slow speed of the parts before the main motor 20 is energized to drive the mechanism at the predetermined operating speed.

It will be understood that the motor 25 is of the reversible type so that the machine may be operated in either direction by this motor depending upon whether the "jog" or "jog-reversed" button is depressed.

As has already been stated, the pulley or balance wheel 17 is rotatably mounted upon the shaft 14 and is adapted to be clutched thereto. This clutch may take the form of a disk 27 secured to the gear 13, this disk carrying an inflatable air clutch member 28 provided with a clutch shoe 29 adapted to be urged into clutching engagement with the clutch band 30 secured to the wheel 17. Air may be introduced into the member 28 through the conduit 31 which leads axially through the shaft 14 and is connected with the line 32 leading to the control valve mechanism designated generally by the numeral 33. Thus when air is introduced into the clutch member 28, the wheel 17 will be clutched to the pinion 13 keyed to the shaft 14, and the gear and shaft will be driven from the shaft of the main motor 20.

In order to stop the mechanism, an air brake is provided upon the shaft 14. This brake comprises a brake drum 36 secured to a hub 37 keyed to the shaft 14. This brake drum is adapted to be engaged by brake shoes 38 carried by an air-operated brake member 39, this member being supported by a band 40 secured to a portion 41 of the frame of the machine.

With this construction it will be seen that when air is introduced into the inflatable member 39 the brake shoes 38 will be engaged with the drum 36 and, as the brake band 40 and associated parts are fixedly secured to a stationary part of the machine, a braking action will be applied to the shaft 14. Air is introduced into the brake member 39 through the pipe 42 which leads to the valve structure 33.

The controlling valve 33 comprises an outer casing 44 which is provided with an exhaust port 45 and in which is slidably mounted a plunger-type valve 46 having annular reduced areas 47 and 48 thereon. The interior of the casing is connected by a pipe 49 with an air supply line 50. The air supply line 50 also connects with the valve casing through a pipe 51, this connection being controlled by a pedal valve 52 of usual construction, this valve being provided with an exhaust port 53 so that when pressure is relieved from the pedal 54, the line 51 is exhausted to atmosphere. When, however, the pedal 54 is depressed, the line 51 is connected by the valve structure 52 to the line 50.

The valve 46 is operated by a solenoid shown diagrammatically at 55, which solenoid is energized when an emergency button (not shown) is pressed to move the valve to the right or from the position shown in Fig. 4 to that shown in Fig. 5.

During normal operation of the machine the valve is in the position shown in Fig. 4, and it will be seen that the line 32 leading to the clutch structure is in communcation with the line 49 and supply line 50 through the annular space about the valve portion 48. Also the pipe 42 is in communication with the pipe 51 by means of the portion 47 of the valve but the pipe 51, if there is no pressure on the pedal 54, is open to exhaust by the vent 53 so that the brake is not set. This will be the position of the parts during normal working operation of the machine.

However, if the emergency button is pressed to actuate the solenoid 55 and move the plunger-type valve 46 to the right or to the position shown in Fig. 5, it will be apparent that the line 32 leading to the clutch will be placed in communication with the vent port 45 and the clutch will, therefore, be released while the brake line 42 will be placed in communication with the pipe 49 which leads to the supply line 50 and the brake will be set. Therefore, pressing the emergency button applies the brake and simultaneously releases the clutch permitting the balance wheel 17, which is driven by the main motor, to rotate idly while the moving parts of the machine are quickly stopped.

In setting up the machine the operator, by pushing a "jog" button, effects engagement of the clutch 21 and also energizes the auxiliary motor 25, thus driving the shaft of the main motor 20 and thus driving the balance wheel 17. As the clutch 29 is engaged, the crank shaft 11 of the machine will also be driven. This causes the machine to be operated in either forward or reverse at a very slow speed, and after the tools have been set and the machine is ready for operation, the "jog" button may be pressed to bring the machine up to a predetermined speed when this button will be released and the operating button will be pressed to energize the motor 20.

It will be understood that the brake may be operated at any time from the foot treadle 54 whether the machine is being operated by the auxiliary motor 25 or the main motor 20 as operation of the foot treadle connects the brake to the supply line 50 through the valve structure 52. The brake may, therefore, be applied when the clutch is in operating position as it will be at all times except when the safety button is pressed or a safety switch is tripped. The brake will, of course, always be applied when the valve parts are in the position shown in Fig. 5 as at that time the brake is open to the supply line 50 through the pipe 49.

The pin point control which is provided over the machine in setting up for an operative run eliminates the usual slipping of the clutch to obtain a jogging operation of the machine. For this the operator uses only the jogging push button and the brake treadle, and the clutch members are subject to practically no wear as they operate more as a coupling than as a clutch.

While I have shown and described a preferred embodiment of my invention, it will be understood that it is not to be limited to all of the details shown, but is capable of modification and variation within the spirit of the invention and within the scope of the claims.

What I claim is:

1. Drive mechanism for a nut former or the like comprising a main shaft, a main motor having a shaft drivingly connected to said main shaft, said motor shaft extending from the motor casing at one end and a second motor having a shaft drivingly connected to the extended end of said first-named motor shaft to drive the latter and said main shaft when said first motor is inoperative, the driving connection between the main motor and the main shaft comprising an auxiliary shaft drivingly connected to the main shaft, a pulley wheel rotatably mounted on the auxiliary shaft, a clutch to connect said pulley wheel with the auxiliary shaft and means to drive said pulley from the main motor shaft.

2. Drive mechanism for a nut former or the like comprising a main shaft, a main motor having a shaft drivingly connected to said main shaft, said motor shaft extending from the motor casing at one end and a second motor having a shaft drivingly connected to the extended end of said first-named motor shaft to drive the latter and said main shaft when said first motor is inoperative, the driving connection between the main motor and the main shaft comprising an auxiliary shaft connected to the main shaft, a pulley wheel rotatably mounted on the auxiliary shaft and a clutch to connect said pulley wheel with the auxiliary shaft, and a brake mechanism applied to said auxiliary shaft.

3. Drive mechanism for a nut former or the like comprising a main shaft, a main motor having a shaft drivingly connected to said main shaft, said motor shaft extending from the motor casing at one end and a second motor having a shaft drivingly connected to the extended end of said first-named motor shaft to drive the latter and said main shaft when said first motor is inoperative, the driving connection between the main motor and the main shaft comprising an auxiliary shaft connected to the main shaft, a pulley wheel rotatably mounted on the auxiliary shaft and a clutch to connect said pulley wheel with the auxiliary shaft, a brake mechanism applied to said auxiliary shaft, fluid-pressure means to operate said braking mechanism and clutch, and a valve mechanism operable to simultaneously set said brake and release the clutch.

4. In a drive mechanism for a nut former or the like, a main shaft, an auxiliary shaft drivingly connected to the main shaft, a motor having a shaft, a balance wheel rotatably mounted on the auxiliary shaft, means drivingly connecting the motor shaft to the balance wheel to drive the latter from the motor, a fluid-operated clutch means to clutch said wheel to the auxiliary shaft to drive the latter, a brake drum on the auxiliary shaft, fluid-operated brake means to apply a braking action to the drum, a source of fluid pressure, and valve means operable to supply fluid pressure to one of said brake or clutch means and vent the other of said means.

5. In a drive mechanism for a nut former or the like, a main shaft, an auxiliary shaft drivingly connected to the main shaft, a motor having a shaft, a balance wheel rotatably mounted on the auxiliary shaft, means drivingly connecting the motor shaft to the balance wheel to drive the latter from the motor, a fluid-operated clutch means to clutch said wheel to the auxiliary shaft to drive the latter, a brake drum on the auxiliary shaft, fluid-operated brake means to apply a braking action to the drum, a source of fluid pressure, and valve means operable to supply fluid pressure to one of said brake or clutch means and vent the other of said means, and additional manually operated valve means to supply fluid pressure to said brake means when said clutch means is supplied with fluid pressure.

6. A drive mechanism as in claim 4 wherein a second motor is provided, and the shaft of said second motor is connected to the shaft of the first motor through reduction gearing.

References Cited in the file of this patent

UNITED STATES PATENTS

| Re. 15,125 | Lindquist | June 14, 1921 |
| 2,281,569 | Fritsche | May 5, 1942 |
| 2,551,980 | Tholl | May 8, 1951 |
| 2,598,633 | Baldwin | May 27, 1952 |